Oct. 29, 1935.   J. R. MAHAN   2,019,460

WELDED STRUCTURE

Filed Oct. 27, 1933

INVENTOR
Joseph R. Mahan.
by Edward A. Laurence.
his attorney.

Patented Oct. 29, 1935

2,019,460

UNITED STATES PATENT OFFICE 2,019,460

WELDED STRUCTURE

Joseph R. Mahan, Fort Worth, Tex., assignor to The National-Superior Company, Toledo, Ohio, a corporation of Delaware Application October 27, 1933, Serial No. 695,499

6 Claims. (Cl. 287—103)

My invention relates to the art of welding together two or more pieces of metal, and more particularly to the production of an improved form of welded joint by the fusion method capable of supporting higher tensile and bending stresses than can be sustained when employing the types of welds now in general use.

Among the objects which I have in view are the following.

To design the contacting portions of the bodies welded in such manner that any weakened zone, resulting from local over-heating or burning in the welding operation, may be confined at the neutral axis, and also where said zone progresses into the region of highly stressed metal its weakening effect may be compensated by the provision of an increased section modulus where the bending moments are greatest.

The welding together of bodies in such a manner that the region of highly stressed metal is supported or reinforced by at least three thicknesses of material.

Other objects will hereinafter appear.

In lap welding two bars together to form the equivalent of one long bar three types of welds of the fusion method are in general use in the art. These types are the front weld, the side weld and the intermediary weld.

The front weld consists in lapping the squared ends of two bars and welding the transverse edges at the ends of bars to the side of the other bar by the fusion method.

The side weld consists in welding together by the fusion method two bars of different widths and whose ends are in lapped relation, the welding material being fused along the longitudinal edges of the narrow bar to weld it to the face of the wider bar.

An intermediary weld is formed by cutting the ends of the bars diagonally and welding the diagonal edges of each bar to the adjacent side surface of the other bar. When the diagonal edges of these bars form an angle of more than sixty degrees with the neutral axes of the bar it is termed an intermediary weld and its characteristics approach that of a front weld as the angle increases. Where the diagonal edges form an angle of sixty degrees or less it may for all practical purposes be considered a side weld.

Where the structures exhibiting these types of welds are to be subject to static loads, as it is most frequently the case, front welds will be primarily employed because of their great strength and economy. On the other hand when dynamic loads have to be assumed side welds are preferable. The intermediary weld, which may be made to possess similar characteristics to each of the other types of welds, depending upon the angle, is applicable accordingly.

The type of joints comprising this invention are primarily intended for use in welding together axially alined bars which are to be subjected to tension and flexure or bending stresses on a plane of the welded bars and at right angles to the planes coincidental with the apices of the forked ends. This type of weld I define as being a convex curvature weld and it is substantially semi-elliptical or parabolic in shape.

My improved weld not only includes the desirable features of the front and the side welds but utilizes their favorable characteristics to produce a weld much stronger and more durable than any of the other types of welds or a combination thereof.

In the accompanying drawing wherein I have illustrated practical embodiments of the principles of my invention, Fig. 1 is a fragmentary view showing the welding together of a bar of rectangular cross section with the bifurcated end of a second bar arranged in axial alinement with the first bar.

Figure 1:
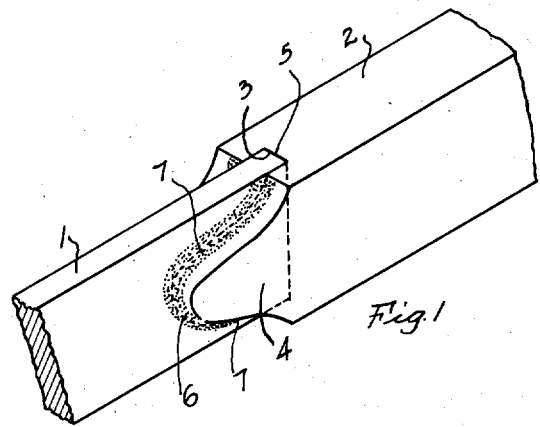

Referring first to Fig. 1 of the drawing, I represents a bar of rectangular cross section which I term as the primary bar and which is welded to the secondary bar indicated at 2. The end 3 of the primary bar I is squared and arranged to fit between the bifurcated or forked ends 4 of the secondary bar 2 and abut against the body of the bar 2, as shown at 5. This form of joint materially strengthens the bar against flexure or bending stresses.

The bifurcated ends may be semi-circular or V-shaped in form, but the preferred form is that of semi-elliptical or parabolic. The semi-circular or V-shaped forms are not found to be as practical as the semi-elliptical or parabolic, but they come within the purview of my invention and show a considerable improvement over the front, side and intermediary welds previously discussed.

The area of the overlap of the semi-circular form of the bifurcated end is large in comparison with the length of the overlap. Therefore the bending stresses in this case have a tendency to localize themselves gradually at and near to the greater diameter of the form or at the upper and lower edges of the bar which are the regions of greatest bending stresses.

The V-shaped form was found to be considerably better than the semi-circular form as the bending stresses do not tend to localize themselves at the edges of the bar. On the contrary they appear more abruptly than any of the other preferred forms. The apex of the V-form tends to be burned during the welding operation. This however does not materially decrease the efficiency of the welded joint as the burning occurs along the neutral axis.

The preferred forms, the semi-elliptical or parabolic, are advantageous in that they contain the desired characteristics of the front and side welds and are not weakened by the undesirable features of the other forms. Slight changes in the curvature of these preferred forms may be made without materially impairing the practicability or efficiency of the welded joint.

6 represents the apex of the forked members which is positioned substantially along the neutral axis of the welded bars indicated at X—X. Welding is accomplished by the fusion method where welding metal is added by fusing it to both bars along the contour of the forked or bifurcated ends, as designated at 7. The apices 6 of the forked ends of the secondary bar 2 are preferably symmetrically positioned on each side of the primary bar 1 so that the welded seams are symmetrical and opposite one another. Due to the localization of heat necessary to produce this kind of welding care must be taken not to allow the line of weld to become intensely or over-heated as it may produce a weakened metal structure in the parent metal of the bars. This weakened effect is termed "rivering". In some instances as where the bar 1 is of relatively thin material it is advisable to offset the bifurcated ends slightly so that the opposed lines of weld are not directly opposite to one another, as otherwise the weakening effect or rivering may cause the joint to become ruptured.

When a bar or beam is sustaining a transverse load there occurs a localization of stress at any point or region where there is a change in cross-section, and the forked ends are best made in the preferred forms described to spread out or reduce these localized stresses.

In the gradually increasing change of cross-section of the joint disclosed in my invention, the initial weakening effect due to rivering occurs on the neutral axis, and as the weakened zone extends diagonally outwardly toward the more highly stressed fibers of the stressed members the cross-sectional area of the primary member at the joint increases toward the secondary member to compensate for the increase in effective weakening of the line of the weld.

Figure 2:
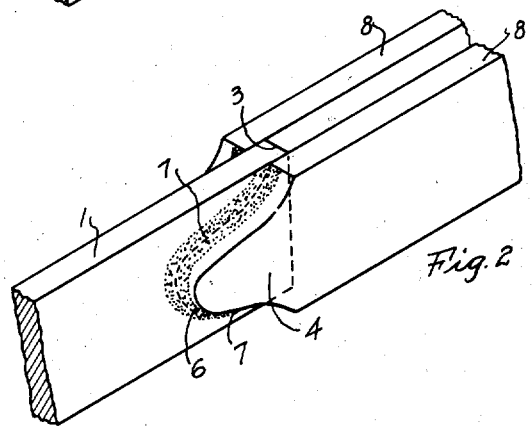
Fig. 2 is a fragmentary view showing the overlapped ends of three rectangular cross section bars arranged in axial alinement.

In Fig. 2, the secondary bar is formed of two parallel bars 8 between the ends whereof the primary bar is inserted. In this embodiment the overlapping ends of the bars 8 are formed with a convex curvature, as in Fig. 1.

However, the welded joint is not in such case supported by end contact of the primary bar, as at 5 in Fig. 1.

This embodiment is advantageous where the secondary bar is to straddle some third element or mechanism, but the weld would be improved if a block, with which the end of the primary bar is arranged to contact, were welded between the bars 8.

Figure 3:
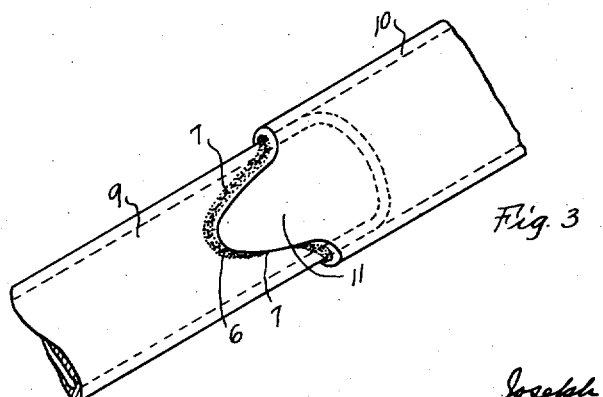
Fig. 3 is a similar view showing axially alined round cross section bars or tubing.

In Fig. 3 I illustrate another modification wherein a cylindrical or tubular primary bar 9 is inserted into the end of a tubular secondary bar 10, the latter being provided with the opposed projections 11 of convex curvature which are welded along their perimetral edges to the primary bar. The inner and outer bars are shown of cylindrical shape but it will be understood that the shape may be varied, if desired.

In extensive commercial use, especially in the oil fields, my improved welded union has proven itself of great value.

I claim:—

1. A composite welded structure comprising two bars arranged in axial alinement with overlapping ends for transmitting a load, the end of one bar being formed with a perimetral edge having a pair of diametrically opposed convex curvatures whose apices are substantially coincident with the neutral axis of the bar and whose root portions are located at the outermost fibers on opposite edges of said bar, a line connecting the apices of said curvatures being substantially normal to said load and a fusion weld between the bars along the said perimetral edge.

2. A composite welded structure comprising two bars, one of said bars being provided with a bifurcated end and the end of the second bar being inserted therein with the bars arranged in axial alinement for transmitting a load, the perimetral edges of the bifurcated extremities of the first bar having convex curvatures with their apices substantially coincident with the neutral axis of the bar and whose root portions are located at the outermost fibers on opposite edges of said bar, a line connecting the apices of said curvatures being substantially normal to said load and a fusion weld between the bars along the said perimetral edges.

3. A composite welded structure comprising a pair of parallel bars and a third bar having its end inserted between ends of the parallel bars for transmitting a load, the bars being in axial alinement and the overlapping ends of the parallel bars having their perimetral edges formed with convex curvatures and their apices being substantially coincident with the neutral axes of said parallel bars and whose root portions are located at the outermost fibers on opposite edges of said bar, a line connecting the apices of said curvatures being substantially normal to said load and a fusion weld between the bars along said perimetral edges.

4. A composite welded structure comprising a tubular bar and a second bar having an end inserted into the end of the tubular bar for transmitting a load, the overlapping end of the tubular bar being provided with a pair of opposed projections whose perimetral edges have convex curvatures with their apices substantially coincident with the neutral axis of the tubular bar and whose root portions are located at the outermost fibers on opposite edges of said bar, a line connecting the apices of said curvatures being substantially normal to said load and a fusion weld between the bars along said perimetral edges.

5. A fabricated bar for use in transmitting power under transverse loading conditions, comprising one bar having the perimetral edge of its end formed in a convex curvature the root portions of which are located at the outermost fibers on opposite edges of said bar, a line normal to the bar and passing through the apex of said curvature being coincident with the neutral axis of the bar and substantially normal to said load, a second bar overlapping the end of the first bar, and a fusion weld along said curvature uniting said bars.

6. A fabricated bar for use in transmitting power under transverse loading conditions, comprising two bars having the perimetral edges of their ends formed in convex curvatures the root portions of which are located at the outermost fibers on opposite edges of said bars, a line normal to the bars and passing through the apices of said curvatures being coincident with the neutral axis of the bars and substantially normal to said load, a second bar inserted between the ends of the first mentioned bars, and a fusion weld along said curvatures uniting said bars.

JOSEPH R. MAHAN.